(12) United States Patent
Petri

(10) Patent No.: US 10,296,305 B2
(45) Date of Patent: May 21, 2019

(54) METHOD AND DEVICE FOR THE AUTOMATED PRODUCTION AND PROVISION OF AT LEAST ONE SOFTWARE APPLICATION

(71) Applicant: Rudolf Markus Petri, Berlin (DE)

(72) Inventor: Rudolf Markus Petri, Berlin (DE)

( * ) Notice: Subject to any disclaimer, the term of this patent is extended or adjusted under 35 U.S.C. 154(b) by 334 days.

(21) Appl. No.: 15/025,266

(22) PCT Filed: Sep. 26, 2014

(86) PCT No.: PCT/EP2014/070663
§ 371 (c)(1),
(2) Date: Mar. 26, 2016

(87) PCT Pub. No.: WO2015/044374
PCT Pub. Date: Apr. 2, 2015

(65) Prior Publication Data
US 2016/0239272 A1 Aug. 18, 2016

(30) Foreign Application Priority Data

Sep. 27, 2013 (DE) ........................ 10 2013 219 655

(51) Int. Cl.
*G06F 9/44* (2018.01)
*G06F 9/45* (2006.01)
(Continued)

(52) U.S. Cl.
CPC .................. *G06F 8/35* (2013.01); *G06F 8/20* (2013.01); *G06F 16/22* (2019.01); *H04L 67/42* (2013.01); *G06F 8/10* (2013.01)

(58) Field of Classification Search
CPC ..... G06F 8/10; G06F 8/20; G06F 8/24; G06F 8/30; G06F 8/34; G06F 8/36; G06F 8/71
See application file for complete search history.

(56) References Cited

U.S. PATENT DOCUMENTS 5,428,791 A   6/1995   Andrew et al.
5,974,253 A   10/1999  Nahaboo et al.
(Continued)

FOREIGN PATENT DOCUMENTS

DE        100 08 632 B4    2/2004
DE     10 2006 038 876 A1  2/2008
EP         0 580 50 B1     5/1999

OTHER PUBLICATIONS

Zenarosa et al., "Towards Automated Oracles for GUI Input Validation", ACM, May 2011; pp. 113-114; <https://dl.acm.org/citation.cfnn?id=1982623> (Year: 2011).*

(Continued)

*Primary Examiner* — S. Sough
*Assistant Examiner* — Ben C Wang
(74) *Attorney, Agent, or Firm* — Maschoff Brennan

(57) ABSTRACT

A method for automated generation and provision of at least one client/server-based software application having a user interface for a user is provided. The method provides at least the following: an application platform, which a user can log into, at least one client-specific database in which data can be stored, at least one application model stored in the client-specific database for generating the at least one software application, which application model is used to describe the functionality of the software application, a user interface and the data structure in a machine-processable form, and a model engine on the application platform for accessing data in the client-specific database.

19 Claims, 9 Drawing Sheets

(51) Int. Cl.
*G06F 8/35* (2018.01)
*G06F 16/22* (2019.01)
*G06F 8/20* (2018.01)
*H04L 29/06* (2006.01)
*G06F 8/10* (2018.01)

(56) References Cited

U.S. PATENT DOCUMENTS

| | | | | |
|---|---|---|---|---|
| 7,694,271 | B2 | 4/2010 | Becker et al. | |
| 8,356,282 | B1* | 1/2013 | Leippe | G06F 11/3664 |
| | | | | 717/125 |
| 8,843,884 | B1* | 9/2014 | Koerner | G06F 8/34 |
| | | | | 717/109 |
| 9,038,017 | B2 | 5/2015 | Premkumar | G06F 8/24 |
| | | | | 715/763 |
| 9,411,845 | B2* | 8/2016 | Mathis | G06F 17/30569 |
| 2006/0248449 | A1 | 11/2006 | Williams et al. | |
| 2007/0174834 | A1* | 7/2007 | Purkeypile | G06F 8/63 |
| | | | | 717/174 |
| 2008/0189679 | A1* | 8/2008 | Rodriguez | G06F 8/34 |
| | | | | 717/105 |
| 2008/0256554 | A1* | 10/2008 | Yassin | G06F 8/24 |
| | | | | 719/315 |
| 2008/0276229 | A1 | 11/2008 | Hawkins et al. | |
| 2011/0078556 | A1* | 3/2011 | Prasad | G06F 9/451 |
| | | | | 715/234 |
| 2011/0137872 | A1* | 6/2011 | Coldicott | G06F 17/30294 |
| | | | | 707/665 |
| 2011/0145783 | A1* | 6/2011 | Seshan | G06F 8/10 |
| | | | | 717/105 |
| 2011/0283194 | A1* | 11/2011 | Chen | G06F 8/38 |
| | | | | 715/735 |
| 2012/0054263 | A1* | 3/2012 | Demant | G06F 9/52 |
| | | | | 709/203 |
| 2012/0054603 | A1* | 3/2012 | Demant | G06F 3/0484 |
| | | | | 715/247 |
| 2013/0305223 | A1* | 11/2013 | Eade | G06F 8/20 |
| | | | | 717/125 |
| 2013/0305224 | A1* | 11/2013 | Eade | G06F 8/20 |
| | | | | 717/126 |
| 2014/0059517 | A1* | 2/2014 | Premkumar | G06F 8/24 |
| | | | | 717/105 |
| 2014/0372428 | A1* | 12/2014 | Mathis | G06F 17/30569 |
| | | | | 707/736 |
| 2016/0239272 | A1* | 8/2016 | Petri | G06F 8/35 |
| 2017/0052766 | A1* | 2/2017 | Garipov | G06F 8/34 |
| 2017/0093684 | A1* | 3/2017 | Jayaraman | G06F 8/71 |

OTHER PUBLICATIONS

Trunzer et al., "A Flexible Architecture for Data Mining from Heterogeneous Data Sources in Automated Production Systems", IEEE, Mar. 2017, pp. 1106-1111; <https://ieeexplore.ieee.org/docunnent/7915517> (Year: 2017).*

Vogel-Heuser et al., "Evolution of software in automated production systems: Challenges and research directions", Elsevier, Dec. 2015, vol. 110, pp. 54-84; <https://www.sciencedirect.com/science/article/pii/S0164121215001818> (Year: 2015).*

C-L-Lazar et al: "Using a fUML Action Language to Construct UML Models", Symbolic and Numeric Algorithms for Scientific Computing (SYNASC), 2009 11th International Symposium on, IEEE, Piscataway, NJ, USA, Sep. 26, 2009, Seiten 93-101.

Kolb, J., et al., "Model-Driven User Interface Generation and Adaptation in Process-Aware Information Systems", Automatic User Interface Generation, Technical Report, University of Ulm, 2012, pp. 1-19.

"Java Architecture for XML Binding," Wikipedia, accessed at https://de.wikipedia.org/wiki/Java_Architecture_for_XML_Binding, pp. 1-5 (Jan. 24, 2018).

"Metamodell," Wikipedia, accessed at https://de.wikipedia.org/wiki/Metamodell, pp. 1-4 (May 16, 2017).

"Serialization," Wikipedia, accessed at https://en.wikipedia.org/wiki/Serialization, pp. 1-9 (May 6, 2018).

"Data object Person," IBM Knowledge Center, Accessed at https://www.ibm.com/support/knowledgecenter/de/SSAW57_8.5.5/com.ibm.websphere.wim.doc/dataobjectperson.html, pp. 1-5.

"Datenmodelle in XML: DTD and XML Schema," WebWorker.Club, Accessed at http://www.webworker.club/datenmodelle-in-xml-dtd-und-xml-schema/, pp. 1-3(2018).

Adler, N., "Model-based development of functionally safe hardware according to ISO 26262," Urheberrechtlitch geschutztes material, pp. 179 (2015).

Bezivin, J., "In Search of a Basic Principle for Model Driven Engineering," UML and Model Engineering, vol. 5, No. 2, pp. 21-24 (Apr. 2004).

Haywood, D., "Domain-Driven Design Using Naked Objects," p. 1 (2009).

Ullenboom, C., "Java ist auch eine Insel," Rheinwerk Computing, p. 1-2 (2016).

Zeppenfeld, K., and Wolters, R., "Generative Software Development with the Model Driven Architecture (MDA)," p. 1 (2005).

* cited by examiner

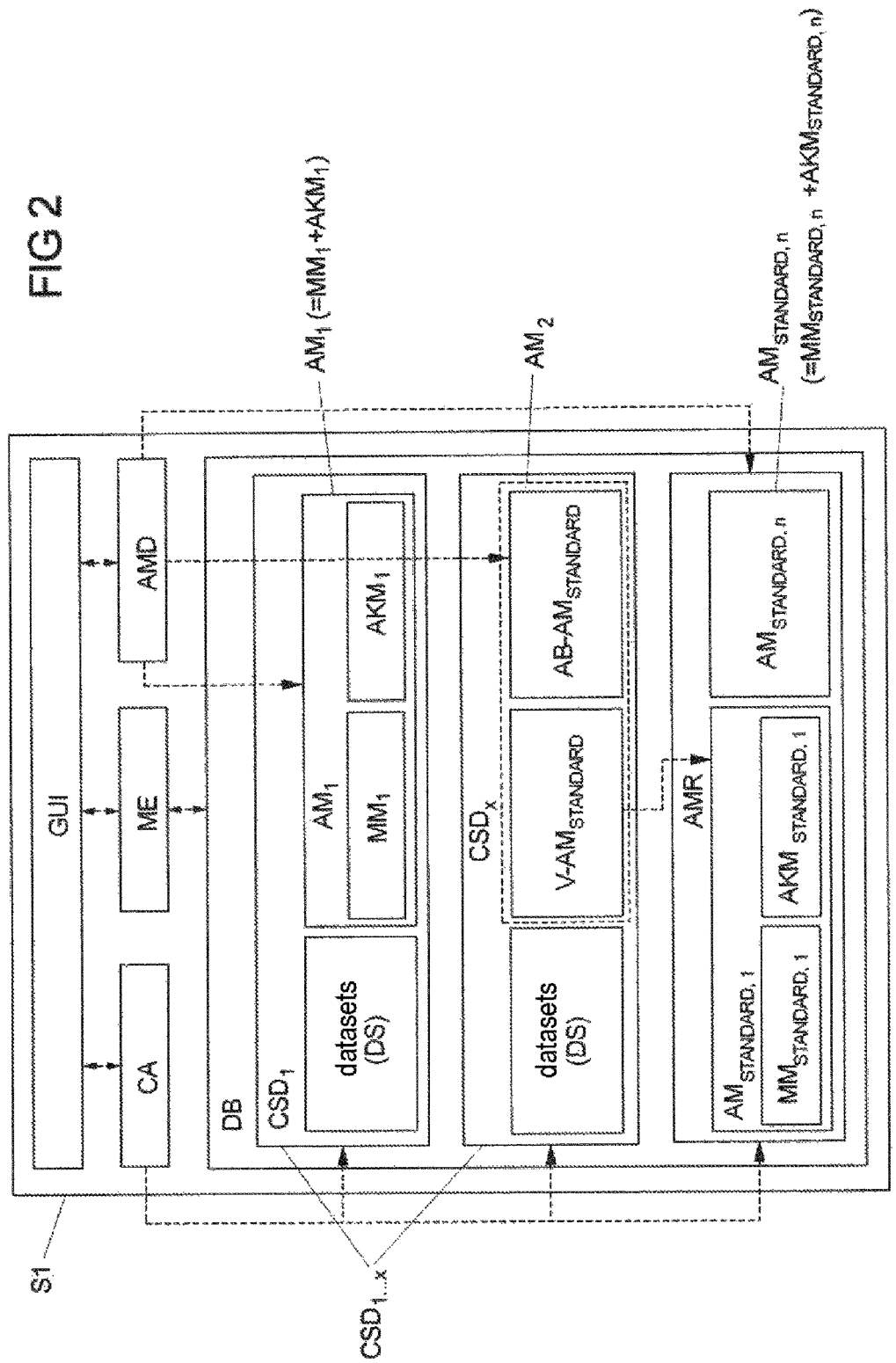

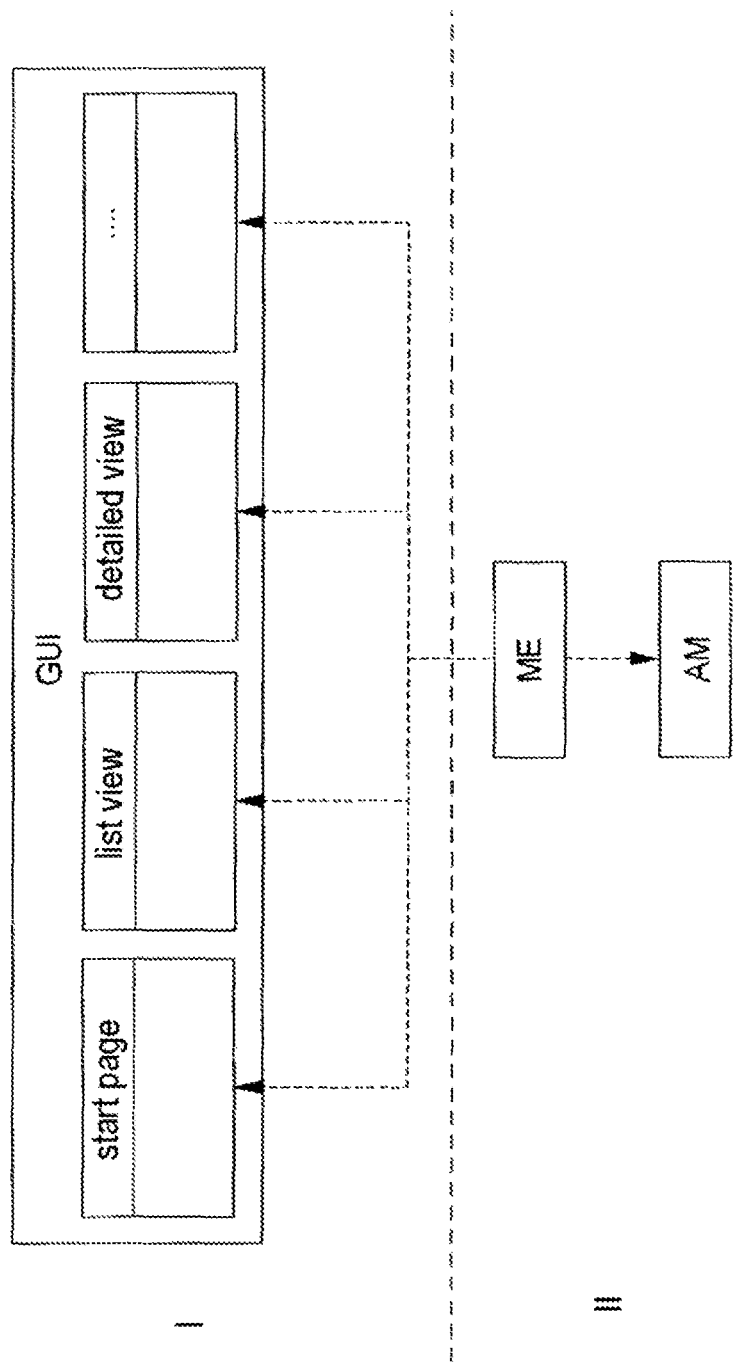

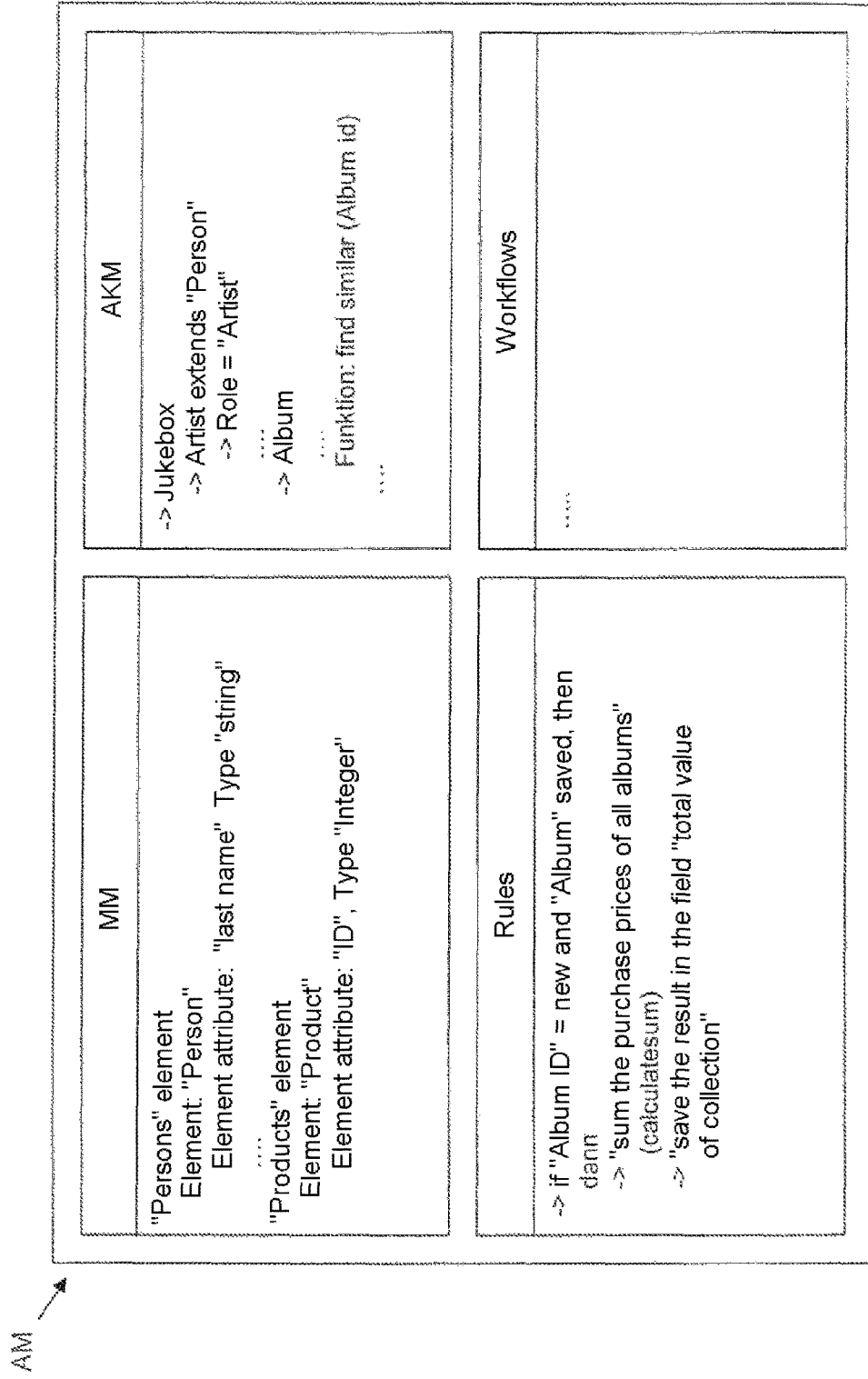

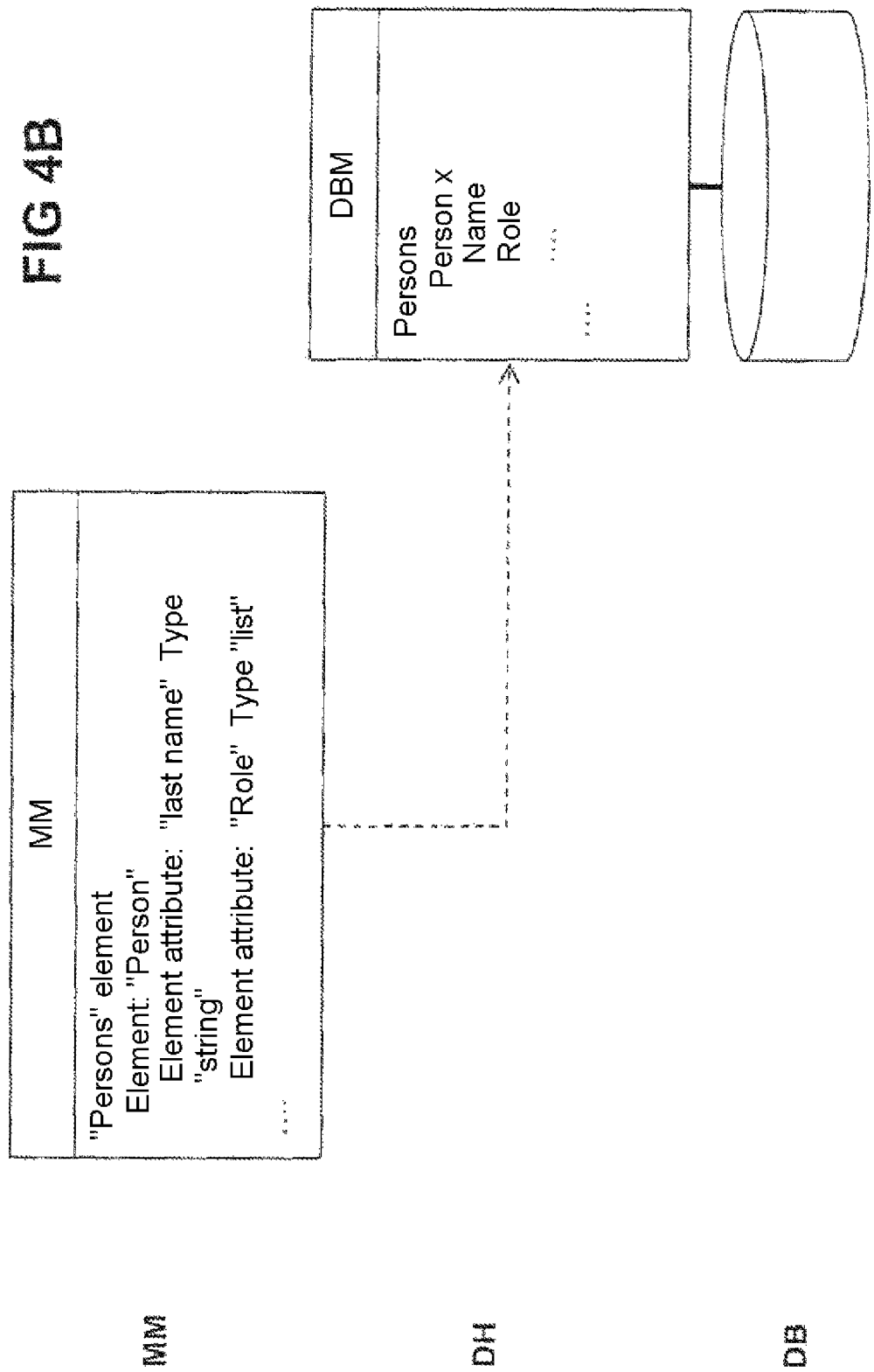

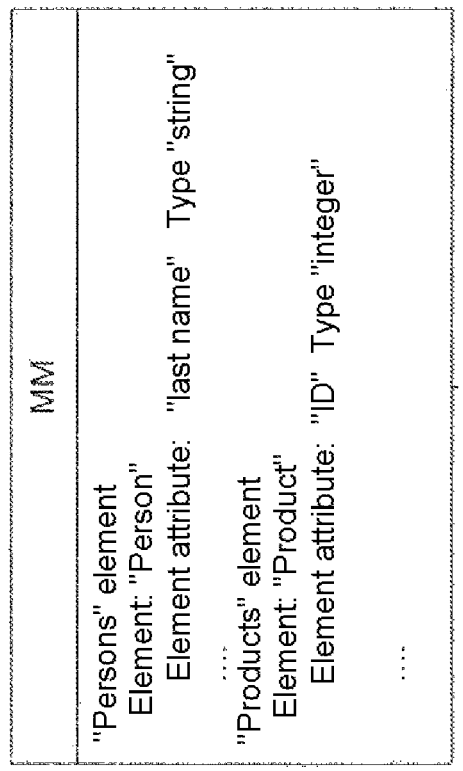
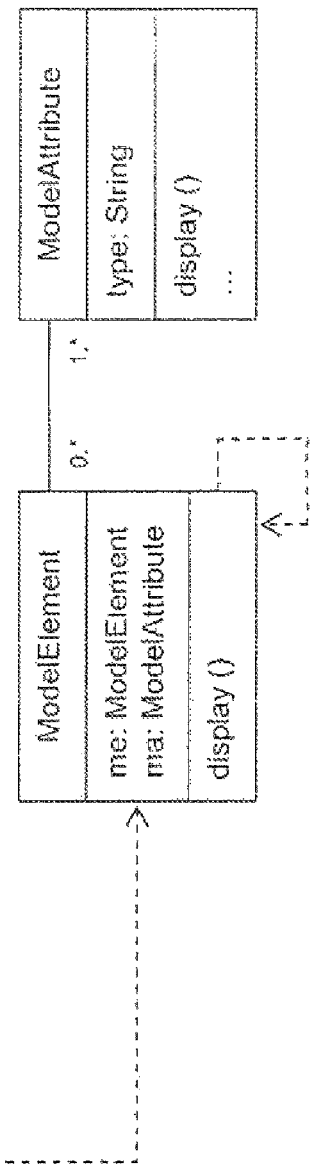
FIG 4C

METHOD AND DEVICE FOR THE AUTOMATED PRODUCTION AND PROVISION OF AT LEAST ONE SOFTWARE APPLICATION

CROSS-REFERENCE TO A RELATED APPLICATION

This application is a National Phase Patent Application of International Patent Application Number PCT/EP2014/070663, filed on Sep. 26, 2014, which claims priority of German Patent Application Number 10 2013 219 655.5, filed on Sep. 27, 2013.

BACKGROUND

The present invention relates in particular to a method and to a computer-implemented device for automated generation and provision of at least one client/server-based, preferably web-based, software application having a user interface for a user.

The conventional approach to creating and providing software applications for use is based on methods and techniques in which software applications are first created by programming and then installed and put into use in an operating environment.

In this approach, software developers first define the business data structure in a specific data model (class model), design the program architecture and put or "translate" the algorithms to be used into programming language (source code). The software developers are usually assisted at each stage by software technologies, procedures and tools that simplify or partly automate the implementation of individual steps in the process.

The prior art in this field is, for example, the "Model-Driven Software Development" (MDSD)/"Model Driven Architecture" (MDA) approach, which in terms of tools is often assisted by integrated development environments (IDE) or frameworks. In Model Driven Software Development, the architecture of the application to be created and parts of the source code (class model) are generated from a model (diagram in the graphical "Unified Modeling Language" or UML diagram for short). Frameworks here provide the structure within which the programmer creates an application, i.e. frameworks usually define the application architecture, the control flow of the application and the interfaces for the specific classes, which must be created and registered by the programmer. The design patterns used in the framework are one of the factors that influence the structure of the custom application. The parts of the source code generated by the MDSD method using the IDE or the framework must still be programmed further, and source code must be added for the (graphical) user interface (GUI), the database interface and further interfaces.

After generation, further programming and adding further code, the source code must be translated into machine code by a compiler in order to make the program machine-readable and hence executable.

Likewise when there are any changes to existing software, the source code must be repeatedly regenerated, bundled into a program and transferred to the runtime environment.

Finally, the created or modified software must be installed on a computer, if necessary configured, and activated in order for the users to be able to use it.

To summarize, in conventional techniques for developing and providing client/server-based, preferably web-based, applications it is hence necessary to:

- use tools first to program the source code of the application, which includes, inter alia, the commands to the processor, which controls the subsequent application program,
- use tools to translate the source code into machine-readable code and to bundle/compile into an application program,
- install the application program on a computer, and
- use a runtime environment to launch and control the application program at runtime.

All current methods and techniques of software development and provision hence have in common that to create or modify software applications, the application logic of a software application must be defined and modeled before the source code can be translated into machine code and the resultant software application can be installed and provided for use. This process is often time-consuming and also is only possible with programming knowledge and hence normally only possible with software experts.

Greater flexibility and adaptability can be achieved by using "business rules" and/or expert systems. These can be used to control, within certain limits, the behavior of a software application at runtime, and to modify said behavior without compiling. This facility, however, is restricted to the application behavior only. It is hence not possible to control all the other elements and aspects of an application (stored data, application logic, interface). Furthermore, the flexibility that can be achieved with this facility relates solely to software applications that already exist and in which the rule-based technology is implemented. It hence cannot be used for flexible generation of entirely new applications.

For larger server-based and database-based software systems, e.g. often in company solutions, there is the additional factor that in addition to programming knowledge, there is also a need for specific IT experience for installation and launching, which requires additional IT experts.

In the various departments and administration of organizations of any size, however, which face the need for greater agility, there is an increasing demand for fast availability of software solutions for pressing tasks and problems, whether through entirely new applications or by adapting existing applications to changed requirements and circumstances. This also applies to a demand for solutions that are required only in the short term or need to be deployed only in the interim or for a specific project.

The users, however, are not normally capable of solving the technical questions associated with creating, providing and operating the applications. The current methods and technologies of software creation and provision are hence little suited in particular to organizations that must remain agile in an increasingly competitive environment.

SUMMARY

Proceeding from this situation, an object of the present is invention is to provide a method and a computer-implemented device which can be used to generate automatically a client/server-based, preferably web-based, software application which has a user interface for a user and can be used to allow the user access to data in a database without said software application needing to be installed for this purpose on a computer of the user. In addition, it is intended that said software application can be adapted particularly easily to the needs of the user and requires a minimum amount of compiling effort.

This object is achieved in particular both by the method as described herein and by the device as described herein.

Each proposes a facility that can be used to generate client/server-based, preferably web-based, software applications automatically from a sector-related application model at runtime, i.e. entirely without programming, compiling or installation, and to provide said software applications for use in a runtime environment (on an application platform). A generated software application in this case does not need to be compiled or installed either on the (client) computer of a user or on a computer for the application platform, e.g. a (web) server. A transition from model function to using a software application is instead made without programming, compiling and installation, so that to design new software applications or to modify existing applications, there is no need to design a database or to program application logic or configure user interfaces.

A method according to the invention, which is used to generate and provide automatically at least one client/server-based, preferably web-based, software application having a user interface for a user, preferably a plurality of software applications, comprises at least the following steps:

providing an application platform, which a user can log into via a network, for example via the Internet or an intranet, providing at least one client-specific database in which data can be stored, providing at least one application model stored in the client-specific database for generating the at least one software application, which application model is used to describe the functionality (and hence the purpose, content and configuration) of the software application, a user interface and the data structure in a machine-processable form, and providing a model engine on the application platform for processing at least one application model and accessing data in the client-specific database, wherein in addition in the method according to the invention:

the model engine, after a user has logged in, uploads the application model at runtime, and not until runtime generates on the basis of the application model a software application comprising application logic and user interface, wherein the application logic defines the processes that can be executed by the software application during operation, and the user can access data from the client-specific database via the user interface, and commands from the user at the user interface relating to a specific data object are passed to the model engine at runtime, and the model engine, with recourse to the application model and the application logic created therefrom at runtime, grants the user access to the data belonging to the data object from the client-specific database, in order thereby in particular to display and/or edit the data and/or to enter and store new data.

The field of use of the present invention is hence the creation of (client/server-based, preferably web-based) software applications and the provision of same on an application platform for immediate use, e.g. as "software as a service".

Thus the application platform provides a runtime environment in which software components such as the model engine can run in order to generate the software application and provide said software application in this environment. It is therefore the task of the application platform to use system tools to combine the software applications defined in the application models via the particular specified configuration with the functional application components contained in the application platform, and to make executable and provide for use said software applications. The application platform is hence needed for a software application to be created at all and provided for a user.

Client-specific means here that databases for a plurality of clients (customers) can be stored on one computer of the application platform, so in particular on the same server, without the individual clients having access amongst themselves to the databases. A client-specific database containing an application model to be uploaded can hence be one of a plurality of client-specific databases which are stored in a central database of the application platform. Hence a plurality of client-specific databases and/or a plurality of pre-configured application models can also be stored in one database of the application platform.

A model engine refers to a software component that allows metadata elements of the application model to be linked to the data from the client-specific database. A model engine can thus be used by a database management system for saving, uploading, updating and deleting data in a database. The model engine here has a translation and coordination function in order to generate specific data objects from data elements of the application model and to interpret commands at the user interface, and also to process said commands using conditions stored in the application model so that the command results in access to data in the client-specific database and is displayed on the user interface. Thus the model engine is in particular able to upload an application model, which, after a user has logged in, was loaded e.g. via a controller of the application platform into a main memory of a computer providing the application program, and then generate a user interface from the model information held in the application model and display said user interface. The model engine can hence also be considered to be an application generator.

Thus an application model fully describes the software application. It defines, inter alia, the display of the initial (home or start-up) user interface of the software application after user login and also how a command, which is entered via the provided user interface and passed to the model engine, results in access to the data in the client-specific database in order thereby in particular to display and/or edit the data and/or enter and store new data. The application model can hence define the purpose, contents, configuration and functionality of the software application and can be used to assemble software applications from provided application components at runtime, to configure said software applications and to control the behavior thereof. The application model is preferably defined in an XML document that can be uploaded by the model engine in order to generate the software application at runtime.

Thus the solution according to the invention allows more efficient use of the limited resources of a data processing system (DP system) and savings in additional, often very expensive, resources. If many different (business-specific) software applications are needed, many different software systems may sometimes be required. Since each software system requires its own system resources and possibly its own technical configuration, then simultaneously operating a plurality of different systems on one DP system is not efficient and may even be critical if the technical configurations are in conflict. For instance problems often occur here if the overall configuration of the DP system is changed when components are replaced or subject to release upgrades. Using the solution according to the invention, all the software applications can be modeled simply using application models, and there is no need to use different software systems. All the applications (including custom applications) are operated on only one application platform. In addition, any number of different applications can be provided simultaneously without the need to install separate software. This is possible because only the database and application model differ from client to client or from software application to software application, and also because the system can process any number of different application models in parallel and can address any number of databases in parallel. Thus such a system conserves system resources because, for instance, it avoids redundancies in system administration and shares the use of resources and/or distributes resources efficiently. Furthermore, the system avoids conflicts arising from different technical configurations that may be necessary in the simultaneous operation of different software systems.

Thus in an embodiment variant of a method according to the invention for a user to access a set of data (dataset) belonging to a data object, which dataset is stored in the client-specific database, the model engine:
   first uploads the application model,
       then generates an object instance of the data object in a main memory (of the computer providing the application platform), and
   uploads the set of data belonging to the data object from the client-specific database before it
   generates on the user interface a visualization of the object instances on the basis of the uploaded data.

In order to increase the flexibility for providing different software applications, the application model preferably comprises at least a metamodel and an application configuration model. In the metamodel are defined generic metadata elements, and data field structures for the user interface (GUI) and/or attributes that belong to the metadata elements are specified. The application configuration model is in turn used to concretize such a metamodel and to define data objects for the software application that are derived from metadata elements of the metamodel, this being done by particular metadata elements or all the metadata elements being assigned in the application configuration model concrete roles for the software application to be generated and provided at runtime. The metadata elements are preferably self-referential, i.e. they can consist of further metadata elements.

When generating, without compiling, the software application from an application model comprising metamodel and application configuration model, the metamodel is preferably loaded at runtime and, likewise at runtime, a class instance of a specific type is generated for each metadata element in a given hierarchy level, and a class attribute is generated for each attribute defined for a metadata element.

The metamodel can include, for example, a scheme definition that defines metadata elements.

In a preferred variant of the invention, it is defined in the metamodel in particular which view types can be used to display a meta-element attribute and hence in particular which view types can be used to display a data field type. In this case, view types and standardized user interface elements can be implemented as components in the application platform. Thus also the form of visualization of model-engine generated object instances can be specified by a view type for the data object, which view type is defined in the application model. In addition, any change to the metamodel can also result in a change to the structure of the data provided from the client-specific database and, if applicable, to a change in the software application at runtime. In this case, for instance, an (XML) file containing the metamodel is modified, and hence with an associated change to the specifications within the metamodel, the stored data is then changed. Dynamic changes to the software application in this way can be performed in particular at runtime, with the result that the application model uploaded by the model engine can be modified after generating the software application and during the use of same.

In the metamodel, meta-element attributes are defined for the metadata elements, for example, and these elements are assigned standardized user interface elements and, in the client-specific database, data field types, with the result that the metamodel defines for the data objects of the software application the display of a data field structure on the user interface.

In the application configuration model it can in turn be defined in a machine-readable form, i.e. in a form that can be read by the application platform, how the user interface of the software application, which is to be displayed after the user login, is meant to be constructed from the standardized user interface elements.

In an application configuration model is at least defined, for example,
   what role (what type) a metadata element assumes in the software application, so that the functionality of a metadata element is given to a specific data object of the software application, and
   how object instances of a data object are displayed on the user interface.

If applicable, the access permissions of a role are also specified here.

An application configuration model defines, for example, one or more software applications (e.g. for documentation and customer relationship management (CRM), for project management, for event management, for managing a music database, etc.). Each client is assigned an application configuration model, which defines and stores in the client-specific database the possible software application(s) that can be provided. In addition, a user account is created for each user, via which the user is assigned to one or more clients. By means of a suitable client-management and permission-management system provided on the application platform, the user thus receives automatically after login the application configuration model intended for him.

In addition, certain functions of the software application that can be executed at runtime can be defined in a machine-readable form by the application model, which is preferably formed from at least one metamodel and at least one application configuration model. A function of this type includes, for example, saving in the database the date of the last access to the client-specific database when the software application is closed, or running mathematical operations on specific datasets or all the datasets in a database, for instance operations such as calculating and saving the sum of all the instances of a specific data object that are stored in the database (for example the total number of all the albums in a music database). For this purpose, for example, the application model contains certain predefined rules and/or workflows.

In this context it is considered advantageous to implement generic function components in the application platform, which are particularized and configured by the application model at runtime in order to provide the executable functions. This simplifies in particular the creation of new application models for software applications provided in the application platform because the generic function components can always be used, for instance, for similar functions, with only minor modifications needing to be made to these components if applicable.

In one exemplary embodiment, the application model comprises, preferably in addition to a metamodel and an application configuration model, an organization model, in which is stored at least one organization structure of the organization in which the software application to be generated at runtime is meant to be used, and/or is stored a business process which is meant to be modeled by the software application to be generated at runtime. Thus an organization model comprises, for example, a (static) structure model, which is used to specify authorizations for processes and/or report structures provided by the generated software application. Alternatively or additionally, an organization model may be a (dynamic, i.e. adapted to the current software application in the same and unchanged organization) business process model that specifies the business processes that are meant to be supported technically by the generated software application.

In one exemplary embodiment, the model engine comprises different managers for the individual (sub)models of an application model, e.g. for the metamodel, the application configuration model and the organization model. It can hence be provided that the model engine comprises
  a first manager for handling the metamodel,
  a second manager for handling the application configuration model, and
  a higher-level generator,
wherein the higher-level generator, after the metamodel has been loaded by the first manager and after the application configuration model has been loaded by the second manager into a main memory, retrieves from the first and second managers information needed to generate the software application, and generates the software application at runtime.

In one exemplary embodiment, the model engine comprises a (third) manager for uploading an organization model, which is contained in the application model and which facilitates automated checking at runtime of the access permissions to be allocated in the software application. The organization model defines for this purpose, for instance, user (groups) and structure information.

Thus for instance, a first module, the metamodel manager, loads the metamodel into a main memory and generates at runtime the concrete objects (instances), i.e. the concrete datasets. A second module, the application configuration model manager, in turn uploads the application configuration model into the main memory, i.e. uploads, for example, the XML file that defines the application context of the software application. A third module, the organization model manager, uploads a business organization model, uses the roles and structure information defined therein to check the access permissions to applications, processes/workflows, data objects, etc. of the software application. The higher-level generator of the model engine is used to retrieve from the three modules the information needed to generate the software application, i.e. which data objects have concrete assignments, what form they assume (inherit) at runtime, how the display on the user interface is meant to be performed and which functions from the application platform are used, etc., and generates the software application at runtime.

As already mentioned, different application models can be stored in a database of the application platform for different software applications, so that to provide one of a plurality of different software applications, the model engine uploads at runtime only one specific application model, and a user interface is generated on the basis of this application model, in particular an initial start-up or home user interface, which is displayed directly after a user logs in.

In one variant, at least one client-specific database and/or at least one preconfigured application model is stored in a local database of a user, whereas the application platform is provided by a server system. The application platform can hence be operated centrally in particular in the "Cloud", whereas the stored data for a runtime-generated software application of a user is stored locally with the user.

In order to make providing application models easier for the individual users and/or clients, standard application models and/or standard metamodels can be stored on the application platform. A standard application model or a standard metamodel can then be modified by an application model designer capable of running on the application platform in order thereby to customize a software application. A modified standard application model or metamodel can then be stored via the application model designer as an additional application model or an additional metamodel.

Alternatively or additionally, it can be provided that an application model is formed merely from a reference to a standard application model and, if applicable, to a specific configuration model, wherein only any differences from the standard application model concerned are specified in the configuration model.

In this case, a standard application model is preferably held in an application model repository. Such an application model repository is preferably stored in a central database that also holds the client-specific databases.

A further aspect of the present invention is a computer-implemented device for automated generation and provision of at least one client/server-based, preferably web-based, software application having a user interface for a user, as described herein. Such a device, which is installed on a computer, in particular a (web)-server, can particularly be designed and intended for performing a method according to the invention.

A device according to the invention comprises at least the following:
  an application platform, which a user can log into via a network,
  at least one client-specific database on the application platform, in which database data can be stored,
  at least one application model stored in the client-specific database for generating the at least one software application, which application model is used to describe the functionality of the software application, a user interface and the data structure in a machine-processable form,
  and a model engine on the application platform for processing at least one application model and accessing data in the client-specific database.

At runtime, after a user has logged in, the application model can be uploaded by the model engine, and, on the basis of the application model, a software application can be generated again by the model engine, which software application contains a user interface via which the user can access data from the client-specific database. For this purpose, the model engine is designed such that commands from the user at the user interface for the software application, which user interface is generated by the model engine, that relate to a specific data object are passed to the model engine at runtime, and the model engine allows the user access to the data belonging to the data object with recourse to the application model.

The application platform can comprise a controller, which after a user logs in, loads the application model from the client-specific database and loads same into the main memory of a computer on which the device is installed.

Since a device according to the invention is designed and intended to perform a method according to the invention, the advantages and features explained above for a method according to the invention apply likewise to a device according to the invention, and vice versa.

Hence a device according to the invention can comprise, for example, an application model designer and/or an application model repository.

As already presented briefly above, an easy-to-use and versatile facility is provided for using any number of models simultaneously, i.e. in parallel, at runtime, and hence for running on the same platform any number of software applications based on any number of different application models. This facility also allows further optimizations to the models at runtime.

In an initial phase, the application model of the software application is generated, for example, from an application-independent metamodel and an application-related configuration model. Then a client-specific database is generated from an empty database and the application model. Finally, at runtime an application generator, the model engine, which is integrated in the application platform, uploads the application model held in the client-specific database and generates automatically from the application logic and interface description contained therein and from the generic views (GUI) and functions held in the application platform the immediately usable software application.

In addition, a computer program product for controlling a computer, in particular a web server, is proposed, which comprises a machine-readable code which, when executed on the computer, is designed to cause the computer to perform a method according to the invention.

A further aspect of the present invention is a machine-readable storage medium, which comprises machine-readable program code which is designed to be executed on a computer, in particular on a web server, and, when said program code is executed, to cause the computer to perform a method according to the invention.

In addition, is proposed a computer-implemented device for creating a computer program product that can be used to execute a method according to the invention, in which an application model comprises at least a metamodel and an application configuration model. According to the invention, such a device comprises at least:

- a first designer module for creating a metamodel, wherein in the metamodel are defined generic metadata elements, and data field structures for the user interface, attributes and/or functions that belong to the metadata elements are specified, and
- a second designer module for creating an application configuration model, wherein the application configuration model is used to concretize the metamodel and to define data objects for the software application, which are derived from metadata elements in the metamodel, this being done by metadata elements being assigned in the application configuration model concrete roles for the software application to be generated and provided at runtime.

To simplify the creation of an application model comprising a metamodel and an application configuration model, at least one designer module defines at least one graphical user interface, via which an operator can create a metamodel and/or an application configuration model. It is thereby possible, even without any detailed programming knowledge, to create and thereby in particular to configure a software application, which is not generated until runtime, on the basis of components of the application model that is to be uploaded later by the model engine at runtime, which components can be generated on the user interface.

In one exemplary embodiment, the metamodel and/or the application configuration model comprise at least one XML document, and the first and/or second designer module are provided for generating and/or modifying an XML document in order to create the corresponding model. It can be provided in particular here that the model engine works with application models which are described solely in XML documents. Thus in this case, physically only XML files are generated and/or modified when an application model is generated.

In one variant, the device comprises in addition to the first designer module (metamodel designer) and the second designer module (application configuration model designer) a third designer module (organization model designer) for creating an organization model, which has already been mentioned above. The individual modules of the device are hence used here to create the corresponding submodels of the application model.

BRIEF DESCRIPTION OF THE DRAWINGS

The following description of exemplary embodiments demonstrate further advantages and features of the present invention with reference to the figures.

FIG. 2 is a schematic diagram of an embodiment variant of a device according to the invention.

FIG. 3 shows schematically the generation of a graphical user interface at runtime by a model engine on the basis of an application model.

FIG. 4A shows an extract of the contents of an application model for an exemplary embodiment of a software application.

FIG. 4B shows schematically the generation of stored data from a metamodel for the exemplary embodiment of FIG. 4A.

FIG. 4C shows schematically the generation at runtime of a class model comprising classes and class attributes by a model engine from a metamodel for the exemplary embodiment of FIG. 4A.

DETAILED DESCRIPTION

Figure 1:
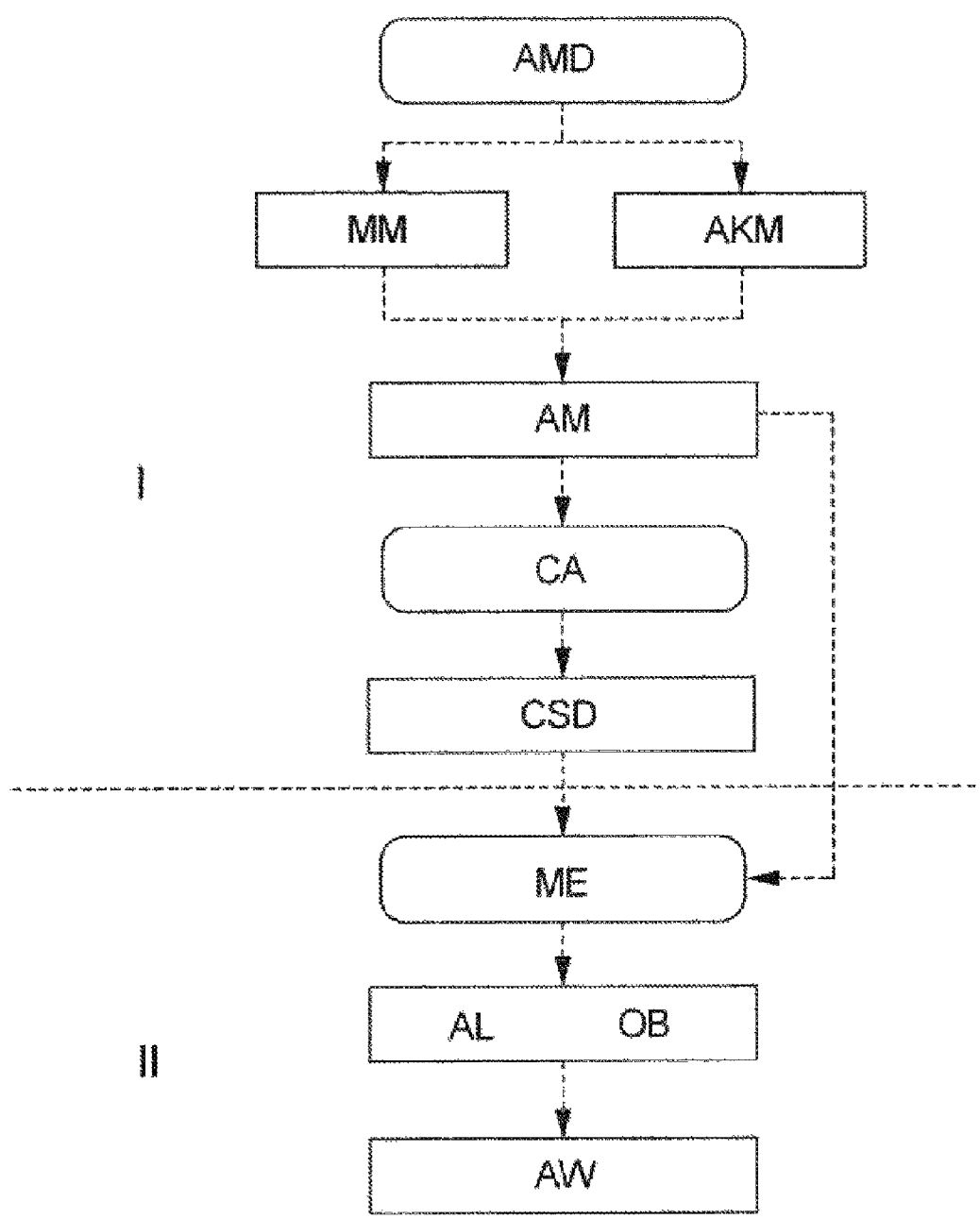
FIG. 1 is a flow diagram for an embodiment variant of a method according to the invention.

FIG. 1 shows first a flow diagram for an embodiment variant of a method according to the invention for automated generation and provision of a client/server-based, preferably web-based, software application AW having a user interface GUI for a user. The flow diagram shown here also includes stages for creating an application model AM and for allocating user permissions by a client administrator, which stages must be performed during the preliminary phase (phase I in FIG. 1) by a provider of the software application AW before said software application can be generated and provided for use in an automated manner when needed at runtime (phase II), i.e. before it can be used.

The essence of the embodiment variant shown is the generation and provision of the software application at runtime without programming.

In this present variant, an application model designer AMD is used to generate an application model AM (in this case a data-oriented application model) of the application from an application-independent metamodel MM and an application-related configuration model, or application configuration model AKM. Then client administrator CA generates from an empty database (not shown) and the application model AM a client-specific database CSD. At runtime, a model engine ME uploads the application model AM held in the client-specific database CSD. This model engine generates the software application AW from an application logic AL described in the application model AM and from an interface description OB, likewise contained in the application model, and from generic functions and generic view types for the graphical user interface GUI. The generic functions and view types are implemented here in an application platform, on which as a runtime environment can run in particular the application model designer AMD, the client administrator CA and the model engine ME.

FIG. 2 shows an embodiment variant of a computer-implemented device S1 according to the invention, which is used to perform the variant of the method according to the invention described by FIG. 1. The device S1 can be used here not only for automatic generation and provision of software applications at runtime on a preferably web-based application platform, but can also be used to create, with the aid of the application model designer AMD and the client administrator CA, the software applications before first-time use.

The device S1 contains an application platform comprising a (generic) user interface GUI, the model engine ME and a central database DB, in which are stored a plurality of client-specific databases $CSD_{1 \ldots x}$. Of these client-specific databases, the figure shows in greater detail by way of example the structure of two databases $CSD_1$ and $CSD_x$, in which are stored, inter alia, datasets DS.

In addition, the device S1 comprises the client administrator CA and the application model designer AMD, which run as tools on the application platform.

The application model designer AMD can be used to create and manage, on the basis of an abstract platform-independent meta-metamodel (not illustrated), specific platform-dependent metamodels and application configuration models. As an example of this, FIG. 2 shows a custom metamodel $MM_1$ in the client-specific database $CSD_1$, and a standard metamodel $MM_{STANDARD,1}$, which is held in an application model repository AMR of the device S1 as part of a standard application model $AM_{STANDARD,1}$.

A metamodel $MM_1$ or $MM_{STANDARD,1}$ is a scheme definition, which describes components in the form of metadata elements. A (client-specific) database model (not illustrated) is derived from a metamodel $MM_1$ or $MM_{STANDARD,1}$.

In addition, a metamodel $MM_1$ or $MM_{STANDARD,1}$ is used at this early stage to model part of the interface of the (software) application AW. The metamodel $MM_1$ or $MM_{STANDARD,1}$ here defines the display of the data field structure of the data object types on the user interface GUI, this being done by meta-element attributes being defined in the metamodel $MM_1$ or $MM_{STANDARD,1}$, and data field types and standardized user interface elements of the generic user interface GUI (e.g. input fields together with cardinalities) being assigned automatically to these attributes.

The application configuration model $AKM_1$ or $AKM_{STANDARD,1}$ defines the rest of the interface. It does this by specifying for each data object of the application AW, which view types are meant to be used in which contexts to display the data object (e.g. single view, list view). The view types and standardized user interface elements are each implemented as components in the application platform. In this present case, the display on the user interface GUI can still be modified later using the application model designer AMD.

An application configuration model $AKM_1$ or $AKM_{STANDARD,1}$ describes the fundamental principles and basic conditions which relate to structures and procedures for a software application AW of the particular client-specific database $CSD_1$ or $CSD_x$ (i.e. organizational units, processes, roles, users, permissions), the business processes to be supported and corresponding workflows, specific stored data DH (see FIG. 4B), the case-based configuration of the generic user interface GUI consisting of base elements (views), the interaction of all the model components, and the behavior of the software application AW (including by means of rules). The application configuration model, an example of which is $AKM_1$ or $AKM_{STANDARD,1}$ in FIG. 2, hence specifies the purpose, content, configuration and functionality of an application AW and is used at runtime to assemble from the application components the application AW, to configure same and to control the behavior of the application.

An application configuration model $AKM_1$ or $AKM_{STANDARD,1}$ is also used to concretize the corresponding metamodel $MM_1$ or $MM_{STANDARD,1}$, i.e. to form concrete objects from the abstract objects defined by the metamodel $MM_1$ or $MM_{STANDARD,1}$, this being done by filling the abstract objects with specific data at runtime and hence concretizing, typing and configuring abstract objects. This can also be used to make further modifications to the attributes predefined by the corresponding metamodel $MM_1$ or $MM_{STANDARD,1}$.

One $MM_1$ or $MM_{STANDARD,1}$ and one application configuration model $AKM_1$ or $AKM_{STANDARD,1}$ together form one application model $AM_1$ or one standard application model $AM_{STANDARD,1}$. Each application model $AM_1$ or $AM_{STANDARD,1}$ fully describes one software application. Here, unlike conventional software development, a (software) application AW is not defined by a concrete business class model, which must be programmed, but by an application model $AM_1$ or $AM_{STANDARD,1}$ transferred at runtime.

An application model can be provided here as a standard application model $AM_{STANDARD,1}$ or as a custom application model $AM_1$. It accordingly describes a standard software application or a custom software application.

The example of FIG. 2 shows for the client-specific database $CSD_x$ one option for storing therein an application model $AM_2$ for the software application AW to be generated at runtime, which application model is formed merely from references $V\text{-}AM_{STANDARD}$ to the standard application model $AM_{STANDARD,1}$ and any differences $AB\text{-}AM_{STANDARD}$ from the standard application model $AM_{STANDARD,1}$. A standard application model $AM_{STANDARD,1}$ can hence be expanded or modified at any time by additional configuration information, created by the application model designer AMD, with the standard application models still being retained in the application model repository AMR.

It should be noted here, however, that a final specification is not associated with the original specific function of an application model as a standard or custom application. Once created, an application model $AM_1$ or a standard application model $AM_{STANDARD,1}$ can be used any number of times by referencing or copying, and, if applicable, can be stored in a modified form as a new application model (in a client-specific database $CSD_{1...x}$ and/or the application model repository). Hence the device S1 can also simultaneously contain and use any number of application models.

Stored data DH of an application is created in the preliminary phase using the client administrator CA. To do this, first an empty database (not illustrated) is created, the desired application model, e.g. $AM_1$, is transferred to the database. Here is generated from the metamodel contained in the application model, in the case of the application model $AM_1$ from the metamodel $MM_1$, the database model, i.e. the concrete data structure, in which the actual data can then be stored.

An application is generated and simultaneously provided for use automatically at runtime. After a user has logged into the device S1, a controller of the application platform (not illustrated) loads under computer control first the application model, e.g. $AM_1$, and loads it into the main memory of the computer (not illustrated), on which the device S1 is installed.

If the user wants to edit a business object (e.g. customer), the relevant request is routed to the model engine ME, which uploads the instantiated application model $AM_1$ (e.g. for a CRM application), evaluates the configuration information from the application model $AM_1$ and generates at runtime the relevant object for the application by converting at runtime abstract data model objects (such as e.g. "organization") into concrete objects (such as e.g. "customer (company)") and allocating said objects to the application. Object relationships (such as e.g. "(n) people belong to an organization"), are likewise evaluated at runtime on the basis of the application configuration model AKM and allocated a type (i.e., for example, only a "contact (customer)" can be assigned to a "customer" and not any person for instance). For displaying the object, the model engine ME passes the necessary parameters to the generic GUI components, which are then used to generate the user interface GUI.

The model engine ME thus provides the objects that are needed for processing and displaying relevant data. If a dataset is meant to be processed by invoking a function, the model engine ME generates at runtime the object needed for this in the main memory. In this case objects have the class "ModelInstance". The class "ModelInstance" is composed of the class "ModelElement" and the parameter defined for this "ModelElement" in the application configuration model AKM. Thus the model engine ME generates by factory methods and by evaluating the application model AM model instances for further processing.

The model engine ME is implemented such that it can model and manage any models or structures. A business class model of the model engine ME itself essentially consists of two classes: nodes and attributes. Nodes can contain attributes. In addition, nodes can be linked to any other nodes. If an application model is transferred, the model engine ME is able to derive from this model a framework composed of nodes having properties (attributes). By virtue of this mechanism, an application logic, which in conventional software development must already be specified back during programming, is not transferred until runtime in the form of the particular application model. This is explained in greater detail in particular in connection with the accompanying FIGS. 4C and 5B with reference to an exemplary software application.

The execution of functions and the display of further views on the user interface GUI at runtime depend on the actions of the user or conditions defined in the application model AM. Here each request or each command (e.g. "display customer data") is first routed to the model engine ME. The model engine evaluates the request on the basis of the application model, e.g. $AM_1$, retrieves the data belonging to the data object concerned from the client database $CSD_1$, calls, if applicable, a specific function component (e.g. "generate document") to perform the operations defined in the object, and displays the data on the user interface GUI according to the information defined in the application model $AM_1$, i.e. using the relevant view.

The application platform here automatically assigns for example to each data area a list view and corresponding basic functions, such as display, add, edit, delete, copy. In addition, each dataset DS can be assigned automatically, for example, a detailed view and associated basic functions, such as add, edit, delete, copy. For each view type is preferably already stored a basic configuration, which is concretized or, if applicable, further modified by information or specifications from the associated application configuration model $AKM_1$. The basic configuration may comprise, for example, indexing, displaying in the form of a table containing empty column names (as arguments), filter functions, basic functions, etc., which the application configuration model concretizes, for example in the form of data object information, by allocating selected fields of the data object to columns in the table, assigning special functions, etc. (see also FIG. 3 in this regard).

If the user requests the associated datasets DS (e.g. the customer data) from a list of objects (customers, interested parties, contacts, etc.) by selecting a data object (e.g. customer), then the model engine ME reads the application model (e.g. $AM_1$) and generates the object instances in the main memory. The model engine ME requests via a database access layer (element of the database DB, not shown separately) the values for the data object from the client-specific database ($CSD_1$) and passes to the generic user interface GUI the visualization of the object instances, in accordance with the information stored in the application model ($AM_1$) about the associated view type (in this case a list view). For the actual visualization, the generic user interface GUI provides the view type and, in accordance with the assignment made in the data model, the standardized user interface elements belonging to the data object, and displays same on the user interface GUI. The data field structure and display in the user interface GUI is here derived automatically from the metamodel ($MM_1$).

In addition to the generic user interface elements, functions of the (software) applications AW are preferably also implemented in the application platform as generic function components, and are particularized and configured at runtime by the relevant application model, e.g. $AM_1$ or $AM_2$. In the application model is defined for this purpose e.g. whether a function is meant to be displayed as a button or triggered automatically. If the latter is meant to be the case, it is additionally specified which conditions are meant to result in execution of the function. Thus it can be defined, for example, that a specific function is executed after saving a dataset DS if the current date is "today". If the function is meant to be displayed as a button, then in the application model is stored the labeling for the button and any preconditions that exist, i.e. for instance whether execution of the function is meant to be dependent on permissions.

It is also defined in an application model, which data object (e.g. person, task, deadline) is meant to be transferred as an argument from the data model, and what post-conditions exist, i.e. for instance whether anything is still meant to take place after executing the function, and if so what.

For instance this includes updating a "last contacted" attribute for a Person data object to "today" and creating a follow-up.

To summarize, a solution according to the invention differs from the conventional method of software development and provision in that in this solution the transition from model definition to using a software application AW takes place without programming, compiling and installation. The solution according to the invention also provides the facility to use simultaneously any number of application models AM at runtime and hence to run on one platform any number of applications AW based on any number of different metamodels MM. This facility also allows further optimizations to the application models AM at runtime. With the conventional methods, however, it is necessary to work with a rigid metamodel.

Hence significant advantages for creating and providing applications can be achieved using the solution according to the invention, which advantages include:
- a high level of flexibility, speed, reliability and serviceability; new applications or modifications and additions to existing applications AW, e.g. in the data objects and data structures, can be implemented without programming and are immediately available because only the (business) application models AM need to be created or edited for this purpose, which can also take place at runtime;
- the creation, provision and running of applications is performed in an integrated manner on the preferably web-based application platform;—there is no need for source-code compiling, installation and the like, nor for other development tools, operating or runtime environments, etc.;
- the reliance on scarce IT experience is reduced; technical knowledge is no longer needed for creating software applications AW because business users can themselves create and immediately use new applications.

An exemplary embodiment illustrated by FIGS. 4A-4C and 5A-5B shall explain in greater detail the principle of operation of the solution according to the invention.

The intention is to create a database application AW (called "Jukebox") for managing audio and video CDs/albums. Apart from the elementary functions such as e.g. display, edit, save and delete, the application is also meant to allow sorting of the datasets, printing of lists and searching for data. It is meant to display the collection of contained data objects in list views in each case and to display the information for each data object in the form of a detailed view.

FIG. 4A shows some of the content (represented in the abstract) of an application model AM for this exemplary embodiment of a software application comprising its metamodel MM and its application configuration model AKM. In addition, the application model AM shown here also defines certain rules, i.e. in particular functions that are meant to be executed at runtime, and workflows.

FIG. 4B shows schematically the generation of stored data DH for the "Jukebox" software application from the metamodel MM, whereas FIG. 4C shows schematically the generation at runtime of a class model comprising classes and class attributes from the metamodel MM by a model engine ME.

Figure 5A:
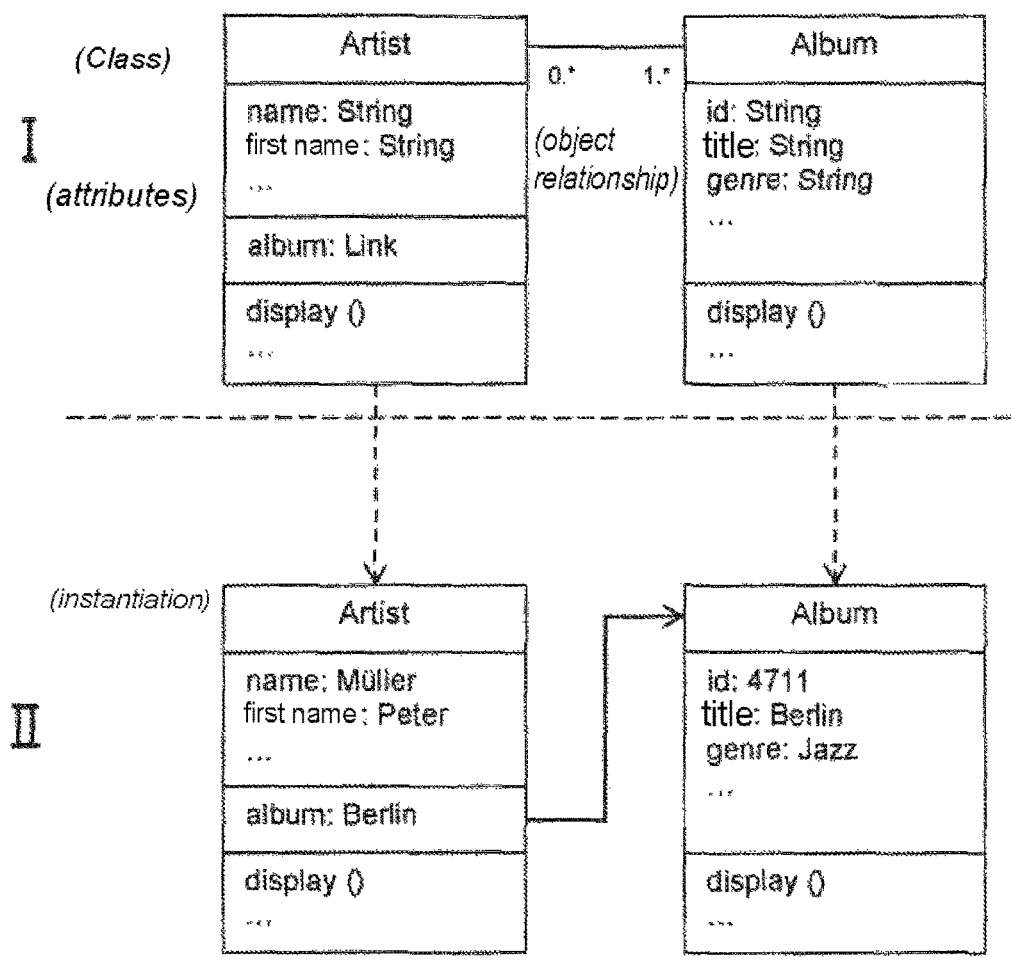
FIG. 5A shows schematically an instantiation at runtime according to a standard object-oriented approach for developing a software application for the exemplary embodiment of FIG. 4A.
Figure 5B:
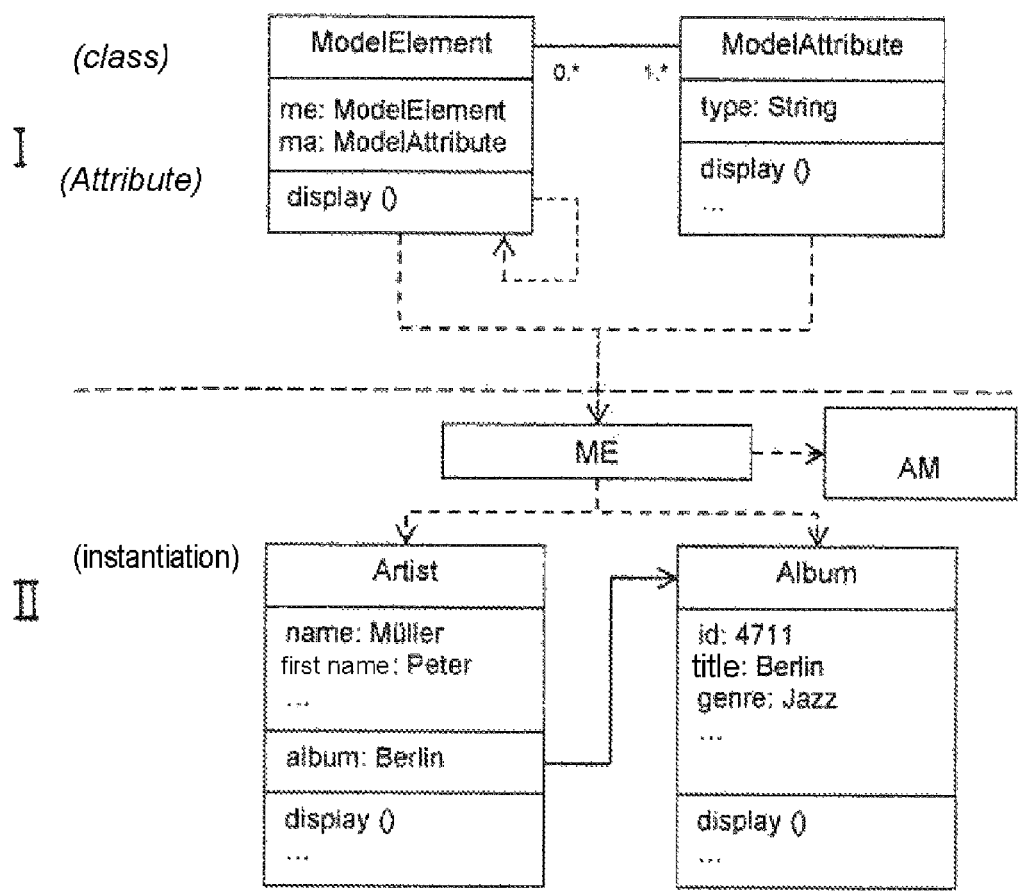
FIG. 5B shows schematically an instantiation at runtime according to the method according to the invention for the exemplary embodiment of FIG. 4A.

FIGS. 5A and 5B are used to contrast the different instantiations at runtime in a conventional object-oriented approach and in the solution according to the invention for the "Jukebox" software application.

It is assumed that there is already a useable metamodel MM containing the "Person" and "Product" abstract data objects.

First, using the application model designer AMD, the application model AM for the "Jukebox" application is now created by selecting the metamodel MM and assigning it to the application by referencing. The basic attributes of the data objects are inherited in this process. Application-specific attributes can now be added, for example in this case adding an Artist name to the Person data. At the same time, inherited attributes can also be selected, for instance in order to hide data fields at runtime.

The basic functions are already specified by the metamodel MM on the basis of a scheme definition, and the application interface is modeled by the metamodel, because the definitions in the metamodel MM also apply automatically to the application model AM of the "Jukebox" application by virtue of the referencing. This is equally true if the metamodel MM was created by copying a standard metamodel $MM_{STANDARD,1}$.

The application model designer AMD now defines, in addition to the metamodel MM also an application configuration model AKM. In this process, the following definitions are made, for example, in the model for the Jukebox:
- For the stored data DH:
    - "Person" data object: to be concretized by the "Artist" role
    - "Product" data object: to be concretized by the "Album" role
- For displaying on the user interface GUI:
    - List view for "Artist": display of columns "Artist name", "Date of birth", "Genre", etc.
    - Display name for the dataset type (e.g. for the display with referencings): Artist name
- For user administration:
    - Roles: Jukebox administrator
    - Permissions: Jukebox administrator is allowed to perform all functions on all data
    - Users: Peter Miller, given the Jukebox administrator role It is specified, for example, for the "Artist" role in the application configuration model that it is derived from the "Person" meta-role of the metamodel MM. The "Artist" role is defined here by a parameter "Role" in the application configuration model AKM, which is meant to be assigned the value "Artist". The assignment to the "Person" meta-role is made here via a path.

In the example shown, for the "Jukebox" application there is therefore a data area called "Artists", in which all the datasets of type "Artist" are listed by means of a specific view type for "Artist", e.g. a list view, defined in the application configuration model AKM. The application configuration model AKM here defines that the "Artist" role must be set for each newly created person, and at the same time only the people that also have the "Artist" role are displayed (in the list). Thus in this case, an "Artist" data object is derived via a parameter "Role" from the "Person" data area of the metamodel MM. The "Artist" data object could be modified or extended using further parameters by means of the application configuration model AKM. For instance, a field "Artist name", which does not exist in the "Person" metadata element, could be added to the "Artist" data object via the application configuration model AKM.

The "Jukebox" application, in particular its database model DBM for the underlying database DB (see FIG. 4B), is completely described by the application model AM comprising the metamodel MM and the application configuration model AKM.

In the application model AM it is also defined, for example, that a function "Link dataset" is meant to be displayed as a button with the label "Link dataset". A link is meant to be possible between the "Product" and "Person" data objects. Post-conditions are not defined. The permission to run the function has been assigned to the Jukebox administrator.

The stored data DH of the "Jukebox" application is created in advance (not by the user) using the client administrator. For this purpose, a database (not illustrated) is created, the created application model AM for the "Jukebox" application is passed to the database, and the concrete data structure is generated automatically. The "Jukebox" application is generated at runtime after a user logs in as already described above for the general case. In this process, the abstract "Person" and "Product" objects are concretized by the "Artist" and "Album" roles respectively.

As FIG. 4C shows in particular, this is done by uploading the metamodel MM at runtime. In this process, for every metadata element defined in the metamodel MM that lies at a defined hierarchy level and is identified in a particular way, is generated a new class instance of a specific type; in FIG. 4C a class of the type "ModelElement". In the exemplary embodiment shown, this applies to the "Person" and "Product" metadata elements, which both lie at the same level.

Since a ModelElement can have any number of attributes, for each metadata element at a lower level is generated a corresponding model attribute (e.g. "surname" or "ID") for the class instance.

All the metadata elements can be loaded in this way from the metamodel MM and created as a class instance for the "Jukebox" software application.

The model engine ME derives therefrom a framework of nodes having properties (attributes) by loading in the same way links already defined in the metamodel MM and modeling each as a ModelAttribute.

The user, for example, now wants to record data for an album and also assign an artist ("Artist") to this album. It should be assumed that a dataset is already created for an "Artist" data object, and the user has opened the list of albums. Selecting the required album dataset and invoking the "display" function (by pressing a "Display" button) on the user interface GUI results in the relevant request being routed to the model engine ME. The model engine reads from the application model AM, amongst other information, information about the "Album" data object, about the permissions of the user and about the display on the user interface GUI, generates the instance for the "Album" data object in the main memory, requests via the database access layer the data on the selected album from the (client-specific) database CSD, and transfers the data for the purpose of display on the user interface GUI to the "Detailed view" view specified by the application model AM for displaying individual data objects. The user thereupon actuates the "edit dataset" function by pressing an "Edit" button. The command is routed to the model engine ME, which in turn reads the application model AM, evaluates the permissions of the user, transfers the command for enabling the dataset for editing to the database DB or to the client-specific database CSD, and passes the command for changing the display mode to the edit/input mode to the user interface GUI.

The user can now enter the data and by pressing a "Link dataset" button can run the corresponding function. In the process, in accordance with the mechanisms already explained above and the definitions made in the application model AM, the list of linkable data objects is first displayed, i.e. in this case "Artist". After selecting the "Artist" data object, running the "display" function and displaying the datasets that exist for "Artist" in a list containing the columns "Artist name", "Date of birth" and "Genre", the required "Artist" dataset can be selected and assigned to the "Album" dataset. The link is made on saving the "Album" dataset in the client specific database CSD by running a "save" function.

Data is saved in this case by means of the stored data DH generated from the stored data scheme. On the basis of the edited dataset (e.g. "Artist") and on the basis of the metamodel MM known to the model engine ME, the dataset can be written to the relevant location in the stored data DH (so in this case under "Persons").

More complex commands and functions are modeled using the rules in the application model AM. The rules are defined in the application model AM in accordance with the usual standards for rule-based systems. The execution of a command defined in this way is initiated by a condition and a trigger, and is performed automatically.

For example, a function "calculatesum" for the "Jukebox" application, which function is defined under "Rules" in the application model AM, calculates a total value for the album collection from purchase prices of the individual albums. This "calculatesum" function sums the purchase prices of all the albums and, when a new album (album ID ="new") is added to the collection and the corresponding dataset DS for the new album has been saved, thereby updates a total value for the album collection that was previously calculated and saved in the client-specific database CSD. The model engine ME here uploads, as already described, the application model AM containing the rules stored therein, evaluates the conditions given by the application model AM, transfers the parameters for further execution of the relevant command and receives the result for the purpose of further processing, i.e. for instance for displaying on the user interface GUI.

Although FIGS. 4A-4C and 5A-5B have been used to illustrate in detail just one embodiment variant for a specific software application "Jukebox", the solution according to the invention is obviously not limited thereto. As was explained in particular with reference to FIGS. 1 and 2, completely different application models for different software applications AW and for different client-specific databases $CSD_{1\ldots x}$ can be stored in a database DB of the application platform. Hence it is not only easily possible to create different (preferably web-based) software applications on an application platform, e.g. as "software as a service", without programming and compiling, it is also possible to generate said applications automatically at run time and to provide them for immediate use.

Figure 6A:
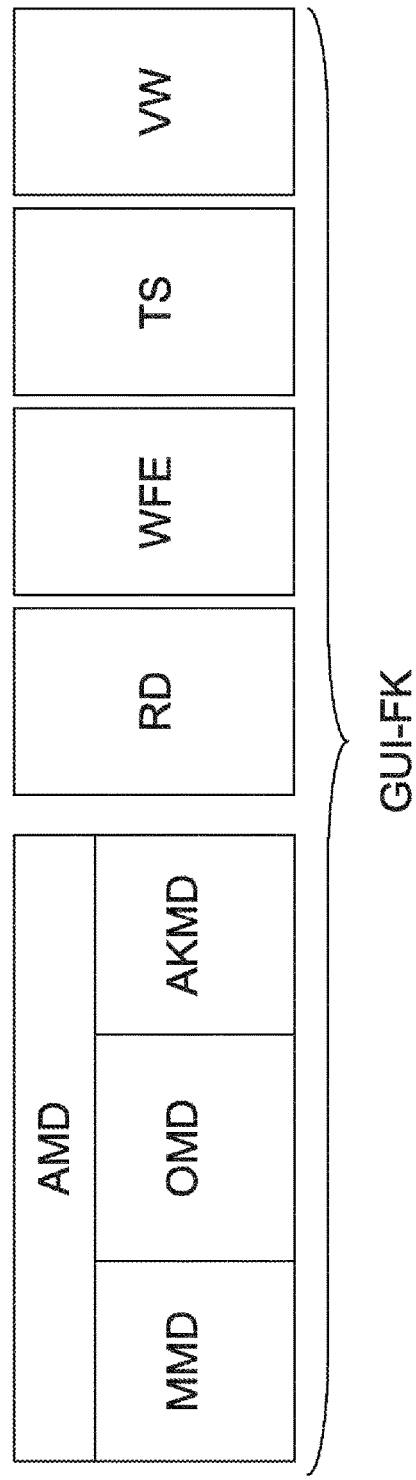
FIG. 6A is a schematic diagram of the functions of a user interface of a device for creating in particular an application model for a software application.
Figure 6B:
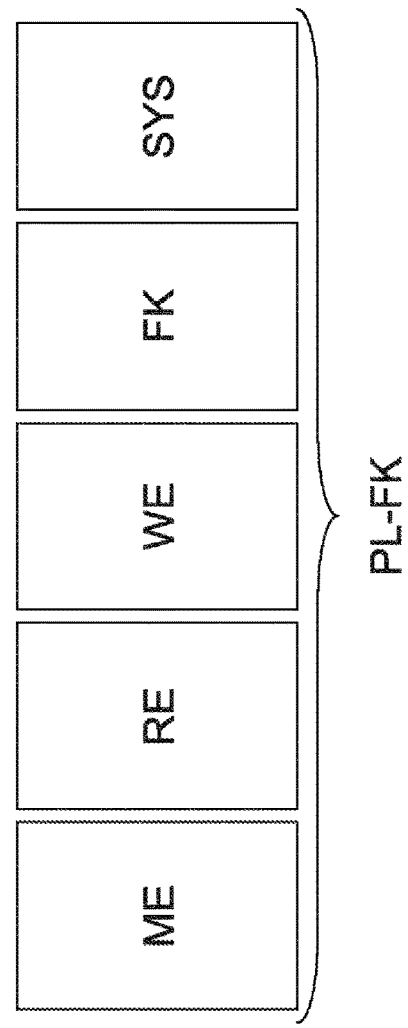
FIG. 6B shows a schematic diagram of the functions of the application platform on which a software application can run on the basis of the solution according to the invention.

In addition, FIGS. 6A and 6B show examples of interface functions GUI-FK of a user interface of a computer-implemented device for creating in particular an application model AM for a software application, and of the application platform on which a software application can run. In a development of the exemplary embodiment shown in particular in FIG. 1, a software application AW supported by stored business processes can be generated and provided in this case by providing an organization model OM in addition to a metamodel MM and an application configuration model AKM.

FIG. 6A shows here system tools, the functions of which can be used by an operator via a user interface in particular in order to generate an application model AM for a software application easily and without in-depth programming knowledge. An application model AM shall in this case comprise a plurality of submodels in the form of a metamodel MM, an application configuration model AKM and an organization model OM.

The metamodel MM
defines the data objects and their relationships/structures and the display on the interface, and
describes thereby the stored data including its visualization.

The organization model OM
describes the fundamental principles and basic conditions which relate to organizational structures relevant to the application, i.e. organizational units, job functions, posts and post holders/users (user permissions, for instance, are derived later from, inter alia, a structure model, which is part of the organization model)
depicts the process model relevant to the area of use and which includes, inter alia, the ideal processes, activities, associated roles, inputs and outputs/event types, and
describes the business processes to be supported by the application (as the basis for workflow support).

The application configuration model AKM
defines the application (metadata of the application) and the context
particularizes the metamodel MM
concretizes and modifies, if necessary, a pre-saved basic configuration, and
particularizes and configures generic functions provided by the application platform.

The device shown schematically in FIG. 6A comprises, inter alia, an application model designer AMD comprising a plurality of modules for the individual submodels of the application model, thus a metamodel designer MMD, an organization model designer OMD and an application configuration model designer AKMD. Furthermore, a rule designer RD, a workflow designer WFE, a test tool TS and (standard) view components VW are provided in addition to the application model designer AMD. The interface functions GUI-FK implemented by these modules shall be described in greater detail below.

The metamodel designer MMD is used to describe the stored data DH of a software application AW and to manage the created metamodels. The purpose of using a metamodel MM is for the data objects and object relationships/structures of an application AW to be defined by the metamodel. For example, the metamodel physically exists in the form of an XML schema file. The organization models OM and application configuration models AKM are likewise described in XML documents. XML is not a programming language but merely a metalanguage. Hence XML documents themselves do not contain, for instance, any commands or loops like a programming language (and thus no instructions to the processor as is the case in conventional "hard"-programmed applications). For it to be possible nonetheless to use the XML documents to generate, provide and control applications, the documents are subsequently evaluated by model engine ME in order to generate commands therefrom.

The metamodel MM is used to define at this early stage object-related rules (in particular plausibility checks) and to model the user interface GUI of the application AW. It also defines the display of the data field structure of the data object types on the user interface GUI, this being done by standardized GUI elements of the generic user interface (e.g. input fields together with cardinalities) being assigned automatically to the data field types described in the metamodel MM. The view types and standardized GUI elements are each implemented as components in the application platform.

The organization model designer OMD is used for the model-based description both of the procedures and of the job-related functional structures of an organization or project (as a time-limited organization). Such a comprehensive organization model OM can be needed in particular for controlling the software application AW to be created.

An organization model OM therefore comprises, for instance separately, at least one structure model, a process model and a business process model. The structure model and the process model here take a rather static view of an organization by modeling its structures and the ideal procedures. The information from a structure model can be used, e.g. for allocating structural, i.e. job-related, permissions, evaluating report structures in the user company differentiated by organizational units, controlling components and functions in business-management, in particular personnel-management, applications or allocating tasks arising in business workflows to relevant agents. For instance, a process model describes the ideal process structure of an organization based on the classical division/categorization into core management processes and support processes. The processes are placed in a hierarchy and represented in greater detail from one level to the next. The detailed process steps defined in this way are used not only for documentation but can be reused, for instance as process components, also in other contexts. In contrast with the structure model or the process model, the business process model is based on dynamic behavior. It describes the specific business processes that are meant to be supported, inter alia, technically by the software application AW to be created. For the purpose of modeling the business processes, the individual process components (activities) corresponding to the business processes to be supported are selected from the (static) process model, placed into the required sequences and combined using linking rules and execution rules. The business processes modeled in this way are then used later as the basis for implementation as workflows.

The application-specific configuration settings are bundled, or modeled, in the application configuration model AKM, which is managed using the application configuration model designer. An application configuration model AKM is used specifically to concretize the metamodel MM, i.e. to form concrete objects from the abstract objects defined by the metamodel MM, this being done by filling the abstract objects with specific data at runtime and thereby specifying, typing and configuring said abstract objects. Further modifications to the predefined attributes can also be made in this way.

The application configuration model AKM concretizes and modifies, if applicable, as already described in detail, also the pre-stored basic configuration (index, table containing empty column names (as arguments), filter functions, basic functions) of a view type, which is assigned to a data area (e.g. by data object information, columns of the table (=selected fields of the data object), allocation of special functions, etc.). The application configuration model AKM also particularizes and configures the functions implemented as generic function components in the application platform. For this purpose, it is defined in the final application model AM for example whether a function is meant to be displayed as a button or triggered automatically. If the latter is meant to be the case, it is additionally specified which conditions are meant to result in execution of the function (e.g. after saving a dataset and if the current date is "today"). If the function is meant to be displayed as a button, then in the created application model AM is stored the labeling for the button and any preconditions that exist, i.e. for instance whether execution of the function is meant to be dependent on permissions. It is also defined which data object (e.g. person, task, deadline) is meant to be transferred as an argument from the metamodel, and what post-conditions exist, i.e. for instance whether anything is still meant to take place after executing the function, and if so what (e.g. updating "last contacted" to "today", creating a follow-up, etc.).

The application model design AMD additionally comprises comprehensive functions, which are used to create the application model AM from the aforesaid submodels and the other application components (rules etc.). Creating an application model AM in this way is done by using configuration to control the interaction of the submodels (MM, OM and AKM), model components and application components and to control the specific form of the business objects. The different configuration options of the individual submodels and application components (from metamodel to business logic of the application AW to be created) are functionally combined in the application model designer AMD.

Some application components can also be created separately, for example, by the rule designer RD and the workflow designer WFE.

The rule designer RD here has the job of defining or recording the business rules and facts, and facilitating the administration, checking and provision of same centrally. In practically all business sectors, business rules (e.g. "if the sun is shining then ice cream costs 50 cents more.") and facts play a major role. They describe not only the organizational knowledge relevant in these business sectors and the control information, but also the business logic of software systems that are meant to support these business sectors. They hence determine how a software system or business process controlled by a software application AW is meant to behave.

The business rules are preferably managed, administered and stored in an audit-compliant manner in a central repository. This is done not only to make them available for creating applications AW, but also to allow the fundamental behavior of an application AW also to be defined later when using the application and to allow the business rules to be modified, simulated and tested and provided at runtime.

It is also intended that it will be possible to use "workflow management" to provide IT support for structured tasks and processes, in particular the business processes defined in the organization/process model, and to automate these tasks and processes if applicable. The workflow designer module WFE is useful for this purpose.

A workflow (or a transaction or generally a procedure) is composed of individual activities that relate to parts of a business process or other organizational procedures. The workflow describes the operational view of the (business) processes to be supported. Ideally this description is made so precisely that the next activity is determined by the output of the activity that precedes it. The individual activities are hence dependent on one another. A workflow has a defined start, an organized sequence and a defined end. It is the part of the (business) process that can be implemented with IT support. Workflows hence are coordinative in character. A workflow is typically achieved by placing the work steps in sequence and in parallel. Synchronous activities proceed strictly separately.

The workflow designer WFE is used for modeling and configuring specific workflows. It can implement the following functions to do this:
  adopting from the organization model OM the business processes/workflows to be supported,
  graphical modeling/particularization and specification of the workflows (e.g. differentiating into different workflows according to permissions and roles of the users)
  verifying the workflows (e.g. whether an event is actually provided at a specific point in time in the workflow),
  simulating the workflows, and
  configuring the permissions and roles of the users.

In addition, the test tool TS provides quality assurance functions for the design and analysis in order to be able to avoid, or at least identify in good time, any errors in the created application model AM or in a software application AW generated using said model.

FIG. 6B outlines functions provided by the application platform using various function components such as the model engine ME. A rule engine RE, a workflow engine WE, a function module FK and a system administration module SYS are provided here in addition to the model engine ME.

As explained above, the model engine can comprise various managers for the submodels MM, OM and AKM of an application model AM, e.g. a metamodel manager, an application configuration model manager and an organization model manager.

The technical components of the rule engine RE comply with the usual standards for rule engines and consist of e.g.:
  rule interpreter,
  core rules execution, and
  rules set (number of different classes of rules).

The workflow engine WE is equipped with the following technological core components, for example:
  workflow GUI (classes needed for displaying the graphical workflow),
  core workflow engine (for administering, implementing and generating workflows), and
  worklist handler (controls the interaction of the individual process participants).

In addition, the function module FK is used to provide functions that can be used within an application model or that can be invoked by the application model. Functions essentially determine here what a generated software application AW can perform. They are used, for example, to perform operations on data and to generate processing results. In practice, the operations can be composed of almost any parameters and hence be of any complexity. In an exemplary embodiment according to the invention, functions are implemented as standard functions so that they can be combined at runtime with any application models AM and application components. Functions are classified as elementary functions, complex functions and configurable functions. Elementary functions are fundamental functions that repeatedly arise and from which other functions can be formed. Examples are saving, copying or deleting data, or emailing. The complex functions are put together from elementary functions using basic arithmetic operations, concatenation, differentiation or integration. They can also be configured in a model-specific manner. Examples of complex functions are:

sorting and searching,
importing and exporting data, and
uploading and downloading files The configurable functions must be customized to suit the specific application model. Examples of such functions are:
defining a scheme for issuing invoice numbers, or
converting an object into another object (e.g. a quote into an order and ultimately into a monthly recurring invoice).

The functions are implemented in the application platform as generic function components that must be developed in a conventional way. The configurable functions, however, can be particularized and configured at runtime by the application model AM. It is defined in the application model AM, for instance, as already described above, whether a function is meant to be displayed as a button or triggered automatically.

The system administration module is a central technical component of the application platform. It has the job of providing the administrative interfaces for setting up and administering the entire system and for assisting the smooth operation of said interfaces. It preferably provides the following functions:
administering and configuring general system parameters,
setting up and administering clients (manual creation, copying clients, automatic creation of standard clients and preconfigured solutions, etc.) and client types (active/provisional clients, client models amongst others),
administering users and user groups, and
managing roles and permissions.

To summarize, the invention proposes a method and a technical device for generating software applications AW automatically without the need to be able to program, compile and/or install.

According to the invention, applications are preferably first defined/described using suitable tools in comprehensive models and then generated and configured in a model-driven manner using the necessary data structures (classes/data objects and business objects), business/application logic and views.

Unlike conventional software applications whose context is fixed in the source code, an application is not created until runtime, i.e. when the user logs in. Not until this point in time is an application model AM for which the user is authorized loaded into the cache of the web/application server and imported into a model engine ME and processed. The application AW itself is generated here from the application logic AL and interface description contained in the application model AM and from the generic application components contained in the application platform. All the information relevant to an application AW is modeled in the application model AM (including information about the application purpose/context, the roles and access permissions of the user, etc.). After the roles and permissions of the user are checked, the appropriate start screen is generated. Likewise for every further action in the application AW (whether made by the user or automatically by the system), the application model AM is first uploaded and processed, which then defines the further behavior of the application AW.

When the user next logs in, changes made to the application model AM in the meantime automatically result in a corresponding update to the application AW.

In order to be able to create and use the applications AW, server-side and client-side operations must be performed. In a preferred exemplary embodiment, components of an overall system composed of at least one (web) server and at least one client are thus:
server-side:
databases,
web server,
application platform, and
designer modules (tools) for creating the models, and
client-side:
browser (in which calculations are performed using functions implemented in JavaScript).

In the technical implementation of a method according to the invention, a database is not absolutely necessary (e.g. for storing application models AM). It is also possible to work with file systems if only XML documents/files are used. If a database is used, however, a non-relational database server is deemed advantageous (e.g. an XML database). Nonetheless it is also possible in principle to use other database technologies. A dedicated database is set up for each client. The databases can be assigned to any number of database servers. These can in turn be fully independent from the application platform and be operated in any distributed arrangement. For instance one possible option is to operate only the application platform centrally (e.g. in the "Cloud") while the stored data is retained at each local site. The application platform can in this case also provide any number of different applications in parallel by addressing the various databases in which the different application models AM are located.

In a "Cloud" solution based on the invention, it is also possible for a user to be able to back up locally, for reasons of security, his know-how contained in (custom or customized) software applications and his data, and hence to have said information stored locally, without having to dispense with the advantages of central data processing. The stored data and the application models AM in which the business/application logic AL of the software applications AW is modeled can be distributed in any way, i.e. also on local resources.

LIST OF REFERENCES

AB-$AM_{STANDARD}$ variants of the standard application model
AKM application configuration model
$AKM_{STANDARD}$ standard application configuration model
AKMD application configuration model designer
AL application logic
AM application model
AMD application model designer
AMR application model repository
$AM_{STANDARD}$ standard application model
AW (software) application
CA client administrator
CSD client-specific database
DB database
DBM database model
DH stored data
DS datasets
FK function module
GUI user interface
GUI-FK interface functions
ME model engine
MM metamodel
$MM_{STANDARD}$ standard metamodel
MMD metamodel designer
OB interface description
OM organization model OMD organization model designer
PL-FK platform functions
RD rule designer
RE rule engine
S1 device for automated generation and provision of at least one software application
SYS system administration module
TS test tool
V-AM$_{STANDARD}$ reference to standardized application model
VW view components
WE workflow engine
WFE workflow designer module

The invention claimed is:

1. A system for automated generation and simultaneous provision of at least one client/server-based software application at runtime, the at least one software application having a user interface for a user, which provides at least the following:
   an application platform, including a processor and a memory configured to provide computer program instructions to the processor to execute the automated generation and simultaneous provision which a user can log into,
   at least one client-specific database (CSD) in which data can be stored,
   at least one application model (AM) stored in the client-specific database (CSD) for generating the at least one software application (AW), which application model (AM) is used to describe the functionality of the at least one software application (AW), a user interface (GUI) and data structure in a machine-processable form, and
   a model engine (ME) on the application platform for accessing data in the client-specific database (CSD) via the user interface (GUI) of the at least one software application,
   wherein the model engine (ME), after a user has logged in, uploads the application model (AM) at runtime, and not until runtime generates on the basis of the application model (AM) the at least one software application (AW) comprising application logic (AL) and user interface (GUI), wherein the application logic (AL) defines the processes that can be executed by the software application (AW) during operation, and the user can access data from the client-specific database (CSD) via the user interface (GUI), and
   wherein commands from the user at the user interface (GUI) relating to a specific data object are passed to the model engine (ME) at runtime, and the model engine (ME), with recourse to the application model (AM) and the application logic (AL) created therefrom at runtime, grants the user access to the data belonging to the data object from the client-specific database (CSD), and
   wherein for a user to access, via the user interface (GUI) of the at least one software application, a set of data (DS) belonging to a data object, which set of data is stored in the client-specific database (CSD), the model engine (ME):
      uploads the application model (AM),
      generates an object instance of the data object in a main memory,
      uploads the set of data (DS) belonging to the data object from the client-specific database (CSD), and
      generates on the user interface (GUI) of the at least one software application, at runtime, a visualization of the object instances on the basis of the uploaded data.

2. The system as claimed in claim 1, wherein the application model (AM) comprises at least a metamodel (MM) and an application configuration model (AKM), wherein
   in the metamodel (MM) are defined generic metadata elements, and data field structures for the user interface (GUI), attributes and/or functions that belong to the metadata elements are specified, the application configuration model (AKM) is used to concretize the metamodel (MM) and to define data objects for the at least one software application (AW) that are derived from metadata elements of the metamodel (MM), this being done by metadata elements being assigned in the application configuration model (AKM) concrete roles for the at least one software application (AW) to be generated and provided at runtime.

3. The system as claimed in claim 2, wherein the metamodel (MM) comprises a scheme definition that defines the metadata elements, and/or it is defined in the application configuration model (AKM) which view types can be used to display a metadata element.

4. The system as claimed in claim 2, wherein at runtime the metamodel (MM) is loaded and a class instance of a specific type is generated for each metadata element in a given hierarchy level, and an attribute is generated for each meta-element attribute defined for a metadata element.

5. The system as claimed in claim 2, wherein in the application configuration model (AKM) is at least defined
   what role a metadata element assumes in the at least one software application (AW), so that the functionality of a metadata element is given to a specific data object of the software application,
   how object instances of a data object are displayed on the user interface (GUI).

6. The system as claimed in claim 2, wherein the model engine (ME) comprises
   a first manager for handling the metamodel (MM),
   a second manager for handling the application configuration model (AKM), and a higher-level generator,
   wherein after the metamodel (MM) has been loaded by the first manager and after the application configuration model (AKM) has been loaded by the second manager into a main memory, the higher-level generator retrieves from the first and second managers information needed to generate the at least one software application, and generates the at least one software application at runtime.

7. The system as claimed in claim 6, wherein the application model (AM) comprises an organization model (OM), in which is stored at least one organization and process structure of the organization in which the at least one software application to be generated at runtime is meant to be used, and/or is stored a business process which is meant to be modeled by the at least one software application to be generated at runtime, and wherein the model engine (ME) additionally comprises a third manager for handling an organization model (OM), and the higher-level generator, in addition to generating the at least one software application, also retrieves information from the third manager once the organization model (OM) has been loaded by the third manager into a main memory, and generates at runtime the software application.

8. The system as claimed in claim 1, wherein the application model (AM) comprises an organization model (OM), in which is stored at least one organization and process structure of the organization in which the at least one software application to be generated at runtime is meant to be used, and/or is stored a business process which is meant to be modeled by the at least one software application to be generated at runtime.

9. The system as claimed in claim 1, wherein certain functions of the at least one software application (AW) that can be executed at runtime are defined in a machine-readable form by the application model (AM).

10. The system as claimed in claim 9, wherein generic function components are implemented in the application platform, which are particularized and configured by the application model (AM) at runtime in order to provide the executable functions.

11. The system as claimed in claim 1, wherein a plurality of client-specific databases (CSD) and/or a plurality of preconfigured application models are stored in a database (DB) of the application platform.

12. The system as claimed in claim 1, wherein at least one client-specific database (CSD) and/or at least one preconfigured application model (AM) is stored in a local database (DB) of a user, and the application platform is provided by a server system.

13. The system as claimed in claim 1, wherein different application models are stored for different software applications (AW) in a database (DB) of the application platform and/or in a local database (DB) of a user, so that to provide one of a plurality of different software applications (AW), the model engine (MM) uploads at runtime a specific application model (AM), and a user interface (GUI) is generated on the basis of this application model (AM).

14. The system of claim 1, wherein the system is implemented as a web server.

15. A non-transitory machine-readable storage medium comprising a machine-readable program code which is designed to be executed on a computer, and, when said program code is executed, to cause the computer to perform operations comprising:
  implementing a software application that provides at least:
    an application platform to execute automated generation of at least one client/server-based software application at runtime, and simultaneous provision which a user can log into,
    at least one client-specific database (CSD) in which data can be stored,
    at least one application model (AM) stored in the client-specific database (CSD) for generating the at least one client/server-based software application (AW), which application model (AM) is used to describe the functionality of the at least one client/server-based software application (AW), a user interface (GUI) and data structure, and
    a model engine (ME) on the application platform for accessing data in the client-specific database (CSD) via the user interface (GUI) of the software application,
  wherein the model engine (ME), after a user has logged in, uploads the application model (AM) at runtime, and not until runtime generates on the basis of the application model (AM) the at least one client/server-based software application (AW) comprising application logic (AL) and user interface (GUI), wherein the application logic (AL) defines the processes that can be executed by the at least one client/server-based software application (AW) during operation, and the user can access data from the client-specific database (CSD) via the user interface (GUI), and
  wherein commands from the user at the user interface (GUI) relating to a specific data object are passed to the model engine (ME) at runtime, and the model engine (ME), with recourse to the application model (AM) and the application logic (AL) created therefrom at runtime, grants the user access to the data belonging to the data object from the client-specific database (CSD), and
  wherein for a user to access, via the user interface (GUI) of the at least one client/server-based software application, a set of data (DS) belonging to a data object, which set of data is stored in the client-specific database (CSD), the model engine (ME):
    uploads the application model (AM),
    generates an object instance of the data object in a main memory,
    uploads the set of data (DS) belonging to the data object from the client-specific database (CSD), and
    generates on the user interface (GUI) of the at least one software application, at runtime, a visualization of the object instances on the basis of the uploaded data.

16. The non-transitory machine-readable storage medium as claimed in claim 15, in which an application model (AM) comprises at least a metamodel (MM) and an application configuration model (AKM), wherein the method comprises at least the following:
  creating a metamodel (MM) via a first designer module (MMD), wherein in the metamodel (MM) are defined generic metadata elements, and data field structures for the user interface (GUI), attributes and/or functions that belong to the metadata elements are specified, and
  creating an application configuration model (AKM) via a first designer module (AKMD), wherein the application configuration model (AKM) is used to concretize the metamodel (MM) and to define data objects for the software application (AW), which are derived from metadata elements in the metamodel (MM), this being done by metadata elements being assigned in the application configuration model (AKM) concrete roles for the software application (AW) to be generated and provided at runtime,
  wherein at least one of the designer modules (MMD, AKMD) defines at least one graphical user interface, via which an operator can create a metamodel (MM) and/or an application configuration model (AKM).

17. The non-transitory machine-readable storage medium as claimed in claim 16, wherein the metamodel (MM) and/or the application configuration model (AKM) comprise at least one XML document, and the first and/or second designer module (MMD, AKMD) allow generation and/or modification of an XML document in order to create the corresponding model (MM, AKM).

18. The non-transitory machine-readable storage medium as claimed in claim 16, wherein the method additionally comprises creating an organization model (OM) via a third design module (OMD), wherein in the organization model (OM) are stored at least one organization and process structure of the organization in which the software application to be generated at runtime is meant to be used, and/or is stored a business process which is meant to be modeled by the software application to be generated at runtime.

19. The non-transitory machine-readable storage medium as claimed in claim 18, wherein
  creating an organization model (OM) by an operator via the graphical user interface, and/or generating or modifying of an XML document via the third designer module (OMD) in order to create the organization model (OM).

\* \* \* \* \*